March 14, 1933.                M. FLAHERTY                1,901,710
                        STOP MEANS FOR ROTARY SHAFTS
                            Filed March 26, 1930
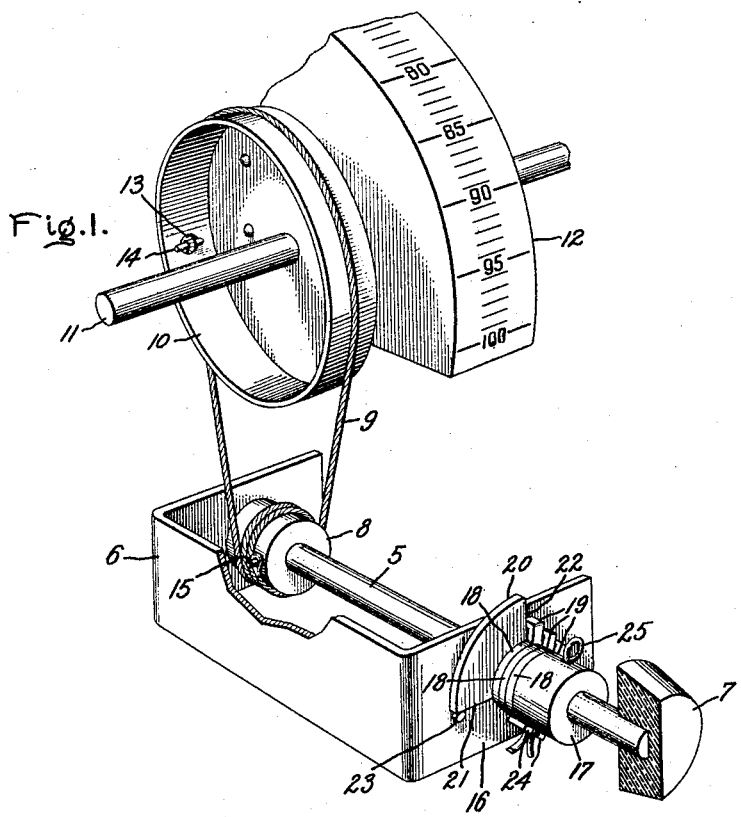
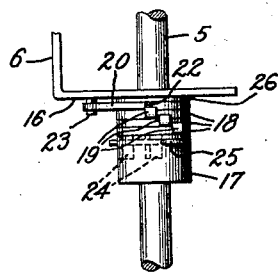
Inventor:
Mark Flaherty,
by Charles E. Mullen
His Attorney.

Patented Mar. 14, 1933

1,901,710

UNITED STATES PATENT OFFICE

MARK FLAHERTY, OF HADDON HEIGHTS, NEW JERSEY, ASSIGNOR TO GENERAL ELECTRIC COMPANY, A CORPORATION OF NEW YORK

STOP MEANS FOR ROTARY SHAFTS

Application filed March 26, 1930. Serial No. 439,235.

The present invention relates to stop means for rotary shafts for limiting the rotary movement of the same to certain desired ranges of operation.

More particularly, the present invention relates to a mechanical drive mechanism provided with a flexible cord as a connection between a driven element having predetermined limits of movement, and a rotary driving element or control shaft therefor which requires more than 360 degrees of rotation to carry the driven element between said limits.

Mechanical drive mechanisms of this type are commonly employed in radio receiving apparatus and the like to provide a connection between a manual control knob or control shaft and the tuning or control device or devices of the apparatus, whereby said device or devices may be moved with a slow or vernier motion. Such mechanisms may include a driven shaft connected with a tuning device and provided with a cable drum or cord reel, a control or drive shaft arranged to be manually rotated and provided with a cable or cord winding drum or sheave of smaller diameter than the first-named drum, and a flexible cable or cord wrapped about the two drums to mechanically connect them and the shafts with a vernier or reduction drive.

Drive mechanisms of this character which include a drive cord as a connecting means between the driving and driven elements are often subject to operating troubles, involving stretching and loosening, or even breakage of the cord. This is chiefly for the reason that the control or drive shaft must be rotated through more than 360 degrees to move the controlled or driven device or shaft through its full operating range of usually 180 degrees and that the control or drive shaft may not, therefore, be stopped or limited by an ordinary stop or abutment to establish the limits of movement of the driven device. The stop means may easily be applied to the driven device itself, but this arrangement may impose stresses upon the cord often to the point of breakage, when by accident or carelessness the driving force from the driving or control shaft is transmitted through the cord to the driven device with the latter against one or the other of the stop means provided for limiting its movement to the desired range.

Heavy cords and cords of woven metal have been used heretofore to prevent breakage in connection with mechanical drives of the above type, but lighter, more flexible fish line cords are more desirable for the reason that they are cheaper and more easily applied, and provide a smoother control. The use of such light non-metallic cords has been limited heretofore because of frequent accidental breakage in operation as hereinbefore mentioned.

It is, therefore, the object of the present invention to provide an improved stop means for a drive mechanism of the type above described which may be applied directly to the driving or control member or shaft thereof without limiting the movement of said shaft to less than 360 degrees, whereby a force injurious or destructive to the drive cord when applied to said shaft may be met directly through the shaft only and be prevented from being transmitted through the drive cord.

A further object of the invention is to provide an improved stop means for a rotary shaft whereby it may be rotated between limits of rotation greater than 360 degrees.

The invention will herein be described in its application to a control shaft for a radio tuning device although it should be understood that it is not limited thereto. The invention will however be better understood from the following description when taken in connection with the accompanying drawing and its scope will be pointed out in the appended claims.

In the drawing, Fig. 1 is a view in perspective and partly in section showing a mechanical drive mechanism or tuning control system provided with a stop means embodying the invention; and Fig. 2 is a plan view and on the same scale of a detail of Fig. 1 further illustrating the stop means.

Referring to Fig. 1 of the drawing, 5 is a rotary tuning control member or shaft of a radio receiver which is suitably journaled in spaced bearings provided by a supporting bracket 6. The shaft is provided at one end with a knob 7 by which it may be manually rotated, and adjacent the opposite end is provided with a cord sheave or drum 8 about which is wrapped a drive cord 9 of flexible material such as a strong non-metallic fish line. The drive cord 9 is wrapped about a larger drum 10 which is secured to a shaft 11 along with an indicating scale 12, forming part of the tuning means for use in a radio receiver. Shaft 11 may be a main control shaft or tuning control shaft of such a receiver.

The flexible cord 9 is secured to the drum 10 at one point 13 by suitable means such as a pin 14 and is secured to the sheave by other suitable means such as a second pin indicated at 15. The cord is thus adapted to provide a positive drive means between the shaft 5 and shaft 11 through the intermediary of the sheave 8 and the drum 10. The above described arrangement represents any mechanical drive mechanism which is provided with a flexible cord as a connecting element between a driven element having predetermined limits of movement and a rotary driving element which requires more than 360 degrees of rotation to carry the driven element between said limits.

It will be observed in the present example that it will be necessary to rotate the shaft 5 several revolutions in order to cause the larger drum and connecting shaft 11 to rotate through a portion of one revolution. In the usual form of radio tuning mechanism which is illustrated in the present example, the reduction ratio between the shaft 5 and the shaft 11 is usually in the order of five to one, that is, shaft 5 must be rotated five revolutions to rotate the shaft 11 through one revolution. With a tuning mechanism or other device such as dial 12 connected with the shaft 11 and requiring only 180 degrees of rotation, the shaft 5 will then be required to rotate substantially two and one-half revolutions to cause the driven device on shaft 11 to rotate between its limits of movement.

It will be seen that under the above conditions of operation, to provide stops in connection with shaft 11 to limit its rotary movement and that of its connecting apparatus would be to impose stresses upon the drive cord 9, if and when the shaft 5 was forced to drive the shaft 11 and its connected apparatus against said stops.

In accordance with the invention, a single stop means for the mechanical drive mechanism above described is associated directly with the control element or shaft 5 whereby it operates to stop shaft 5 substantially directly at the point at which a driving force is applied, thereby preventing breakage or stretching of the drive cord 9. Such drive cords may then be light and flexible and preferably may be of the fish line type, thereby contributing materially to the smoothness of operation of such drive mechanisms.

Referring now to Figs. 1 and 2, it will be seen that the stop means provided for shaft 5 is placed preferably adjacent a flat surface such as that provided by a surface 16 of bracket 6, through which surface shaft 5 passes substantially at a right angle thereto. Mounted on the shaft 5 between the surface 16 and a shaft collar 17 are a plurality of rotatable stop members or washers 18 which are freely rotatable upon the shaft and which are held in close running engagement with each other between the face 16 of bracket 6 and the collar 17. The washers are all of substantially the same thickness and design and with the exception of one of them they are provided with hooked projections or stop fingers 19 of substantially duplicate construction, arranged on the shaft so that the ends of the hooks of the projections all point in the same axial direction with respect to the shaft. The hooked ends of the projections are of such length that they extend into the plane of rotation of another and adjacent member or washer and the next adjacent projection, as indicated more clearly in Fig. 2. The single washer not provided with a hooked projection is provided with a fan-shaped projection 20 providing two circumferentially-spaced radially extending faces or surfaces 21 and 22 which move in a circular path adjacent the wall 16. The latter is provided with a fixed abutment or stop pin 23 arranged in the path of rotation projection 20, as indicated in the drawing.

The stop member or washer adjacent the collar 17 is in addition to the fingers 19 provided with a pair of fingers 24 which are arranged to be engaged by a cotter pin 25 which passes through the collar 17 and the shaft 5, thereby locking the collar 17 to shaft 5 along with said washer.

It will be seen that the stop device of the present example comprises a plurality of washers each having a projection so arranged that at each turn of the drive shaft it will pick up or engage the next adjacent washer and carry it through substantially one revolution, until the last washer in the line of washers comes into contact with the stop pin which locks it and stops the further rotation of the drive or control shaft 5.

The projection 20 on the washer adjacent the stop pin 23 is relatively wide, providing a relatively wide spacing between radial surfaces 21 and 22. The width of this projection is such that control shaft 5 may be rotated a number of revolutions and the exact fraction of a revolution whereby the control shaft 11 and its connected apparatus such as dial 12 may be moved exactly between predetermined limits, represented in the present example by the ends of the scale 12, one of which is shown in the present example.

The spacing between surfaces 21 and 22 may be relatively wide or relatively narrow depending upon the range of movement required to effect exactly the desired movement in the device or shaft controlled by the control shaft 5, and upon the ratio of the reduction between the device or shaft 11 and the shaft 5, provided by the difference in ratio between the effective diameter of the sheave or drum 8 and the effective diameter of the drum 10.

The stop means of the present invention may be considered to include a plurality of rotatable members mounted on a shaft for which a stop means is to be provided, each of said members carrying a stop finger or projection adapted to engage an adjacent member whereby said members successively interlock, each to carry another and adjacent member in the direction of rotation, after rotating through substantially one revolution. One of the members is connected with and is controlled by the rotation of the control or drive shaft directly. Another of the members, freely rotatable on the shaft, is controlled in its rotation only by a fixed abutment or stop means positioned in its path of rotation and arranged to engage one or the other of two spaced surfaces provided thereon.

It will be seen that the above-described arrangement provides for rotating the control shaft through more than one revolution, that is, through a greater travel than 360 degrees as is required in connection with mechanical drive mechanisms of the class described. It will further be seen that each washer or rotatable member provides for substantially one revolution of the shaft and as many washers or rotatable members may be mounted on the shaft as is necessary to provide the required number of revolutions of control shaft 5 to effect the desired movement of the controlled member or shaft 11.

In the present example, a washer 26 (Fig. 2) is placed adjacent face 16 of the bracket 6 as a spacing means whereby the first washer 18 adjacent the bracket, may rotate more freely in spaced relation to the face of the bracket 6. In the present example, the face 16 of bracket 6 and the collar 17 serve as means for maintaining the rotatable members one adjacent the other in closed running relation to each other.

It will readily be apparent that the construction embodying the present invention has numerous advantages, among which are the protection of the drive cord provided between the driving and the driven members of the mechanism, a simple construction comprising a plurality of substantially duplicate rotatable members adapted to be mounted upon a shaft, and simple means for holding said members in close running relation to each other on the shaft and in connection with the shaft. The washers or rotatable members are easily stamped from sheet material, the projections or fingers being formed at the same time. Since they operate loosely upon the shaft, no precise dimensions or exact fitting of the parts are required. To provide for connecting the driving washer or member with the shaft includes merely the provision of means for engaging a pin extending through the shaft. In the present example the pin is employed to hold a collar on the shaft which collar serves as a means for holding the washers one adjacent the other. The stop means may thus be easily and cheaply manufactured and easily assembled in an apparatus.

What I claim as new and desire to secure by Letters Patent of the United States is:

1. The combination with a mechanical drive mechanism including a rotatable control shaft, a movable driven element having a desired range of movement between predetermined limits, a flexible cord arranged to connect said shaft and element for transmitting a moving force from said shaft to said element, said control shaft requiring at least 360° of rotation to carry said driven element between said limits, of a stop means for limiting the movement of said element to a desired range, said stop means being connected directly with said shaft whereby a moving force applied to said shaft and received by said stop means is prevented from being transmitted through said cord.

2. In a mechanical drive mechanism, the combination with a driven element having predetermined limits of movement, a rotary driving element therefor which requires more than 360 degrees of rotation to carry said driven element between said limits, and a flexible cord providing a mechanical connection and motion transmitting means between said elements, of a stop means for said mechanism adapted to stop said driven element at the limits of its movement, said means including a plurality of freely rotatable members associated with said driving element and arranged to rotate coaxially with and adjacent each other, each of said members being provided with a projection which extends into the plane of rotation of another and adjacent member whereby when rotated said members successively interlock each to carry another and adjacent member in the direction of its rotation after rotating through substantially one revolution, means connecting one of said members with said driving element, and means providing a fixed abutment for stopping another of said elements.

3. The combination with a rotatable shaft, of a stop means therefor including a plurality of freely rotatable members mounted on the shaft, means for maintaining said members one adjacent another in close running relation to each other, one of said members having spaced faces adapted to move in a common circular path when rotated on the shaft, a fixed abutment arranged to lie in said path to provide a stop for said member, and the remainder of said members being each provided with a projection extending into the plane of rotation of an adjacent member whereby they are arranged to interlock one with another and finally with the first-named member when rotated, one of said last-named members being secured to the shaft.

4. In a tuning control mechanism, the combination of a rotatable control shaft, a movable driven element including a drum, a flexible cord arranged to connect said shaft and said drum for transmitting a moving force from said shaft to said element, a stop means for said movable element connected directly with said control shaft, said stop means being arranged to permit rotary movement of said control shaft through more than 360 degrees of rotation and including coaxial rotatable members arranged to rotate in adjacent parallel planes, each of said members being provided with a stop finger arranged to project into the plane of rotation of an adjacent member, a fixed abutment arranged to engage a projection on one of said members, and means for securing another of said members to said rotatable shaft.

5. The combination with a mechanical drive mechanism including a rotatable shaft, a movable driven element and a flexible cord arranged to connect said shaft and said element for transmitting a moving force from said shaft to said element, of a stop means for limiting the movement of said element to a desired range, said stop means being connected directly with said shaft whereby a moving force applied to said shaft and received by said stop means is prevented from being transmitted to said cord, and said stop means including a plurality of rotatable stop members mounted on said shaft in freely rotatable engagement one with another, a projection carried by each of said members arranged to successively interlock each to carry another and adjacent member in the direction of rotation, means for stopping one of said members thereby successively to stop all of them and the shaft after said shaft has rotated more than one revolution, and means for connecting one of said members with the shaft whereby said stop means and said shaft are mechanically interconnected.

In witness whereof, I have hereunto set my hand this 21st day of March, 1930.

MARK FLAHERTY.